United States Patent

Folkmann et al.

[15] 3,658,585

[45] Apr. 25, 1972

[54] METHOD OF PRECIPITATING LAYERS OF SEMICONDUCTING OR INSULATING MATERIAL FROM A FLOWING REACTION GAS OR FROM A FLOWING DOPANT GAS UPON HEATED SEMICONDUCTOR CRYSTALS

[72] Inventors: Eduard Folkmann; Erich Pammer, both of Munich, Germany

[73] Assignee: Siemens Aktiengesellschaft, Berlin, Germany

[22] Filed: Feb. 26, 1970

[21] Appl. No.: 14,437

[30] Foreign Application Priority Data

Mar. 18, 1969 Germany..................P 19 13 676.6

[52] U.S. Cl..............................117/201, 117/106 A, 118/48, 23/223.5
[51] Int. Cl. ........................................................C01b 33/02
[58] Field of Search...............117/200, 201, 106 A; 23/223.5

[56] References Cited

UNITED STATES PATENTS 3,293,074   12/1966   Nickl .................................117/106 A Primary Examiner—William L. Jarvis
Attorney—Curt M. Avery, Arthur E. Wilfond, Herbert L. Lerner and Daniel J. Tick

[57] ABSTRACT

Method of precipitating layers of semiconducting or insulating material from a flowing reaction gas, upon heated semiconductor crystals, or for doping such crystals from a flowing dopant gas, wherein totally constant or only gradually changing operational conditions are maintained. The method is characterized by the fact that all working phases are so carried out with constant operational conditions. During one-half of the time required therefor, the reaction gas is transported approximately tangentially from one side over the semiconductor crystals to be processed. During the other half of the required period the reaction gas is transported approximately tangentially from the opposite side over the semiconductor crystals to be processed.

2 Claims, 1 Drawing Figure

Patented April 25, 1972 3,658,585
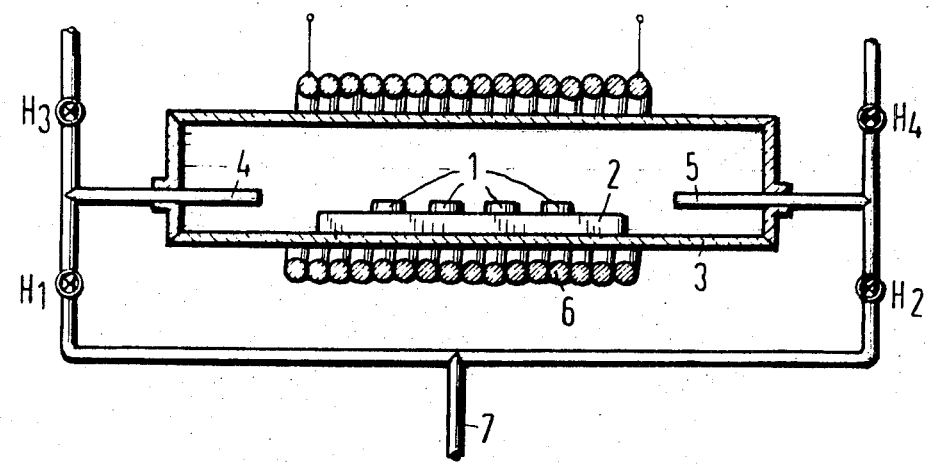

METHOD OF PRECIPITATING LAYERS OF SEMICONDUCTING OR INSULATING MATERIAL FROM A FLOWING REACTION GAS OR FROM A FLOWING DOPANT GAS UPON HEATED SEMICONDUCTOR CRYSTALS

Our invention relates to a method for precipitating layers of semiconducting or insulating material from a flowing reaction gas upon heated semiconductor crystals or for doping such crystals from a flowing dopant gas, whereby operational conditions at all times remain constant or only gradually change.

During the precipitation of epitactic semiconductor layers on monocrystalline semiconductor layers or during pyrolytic precipitation of silicon oxide and/or silicon nitride layers from a gaseous phase upon such crystals, it is difficult to obtain homogeneous layer thickness, particularly when simultaneously coating large numbers of semiconductor wafers. A depletion of the reaction gas occurs in the active substances, which heretofore was compensated by producing a turbulent current of the reaction gas causing a mixing of the exhausted consumed gas with the fresh gas. This required the use of baffle members or moving stirring wings or moving gas inlet nozzles. All these devices necessitate additional, particularly moving bodies in the reaction vessel, which establish a particularly intensive contact with the reaction gas. This increases the contamination danger for the precipitated layers as well as to an increased possibility of undesired precipitations in the reaction vessel.

It is an object of our invention to prevent the inhomogeneity of the precipitation, caused by a depletion of active components in the reaction gas, by the simplest possible means.

To this end, we carry out all operational phases with constant operational conditions and transport the reaction gas approximately tangential, across the semiconductor crystals to be processed, from one side, during half the time required thereto, and during the remaining period from the opposite side.

The method can also be varied in a manner whereby operation is carried out with repeatedly alternating flow directions, during the individual above defined working phases. Incidentally, we wish to point out that the concept of "constantly maintained operational parameter" is to be followed in its strictest sense and that it relates to the constancy of all operational parameters which influence the final result. In this connection, the temperature conditions, the position of the wafers to be treated in the reaction vessel and the composition and rate of the reaction gas above all should be mentioned.

The technical execution of the individual measures which serve for the precipitation of inorganic layers from semiconductor surfaces, respectively for doping semiconductor crystals from the gaseous phase, are known and need not be described in detail. In order to put the method of the invention into effect it is only necessary that the respective process be carried out with constantly maintained operational conditions, either during the entire time which is needed or that said process is comprised of individual steps which are maintained at constant conditions which, however, vary from one another.

The invention provides that each step effected with constant conditions be carried out at an alternating flow direction of the reaction gas, as described above. As a rule, it is sufficient that during the first half of the time required for each of the steps, the reaction gas be supplied from one direction while during the second half of the time required the reaction gas is transported from the opposite direction. However, as previously mentioned, it is sometimes expedient to change the flow direction many times during individual phases. Care must be taken though, that the total periods during which the gas is transported from different directions across the semiconductor wafers to be processed, equal each other during each of the working steps, as well as during the entire process.

The invention will be further described with respect to the drawing, which illustrates apparatus for carrying out the method.

The semiconductor wafers being treated are heated, to the necessary processing temperature, by contact with an inductively heated plate 2 of electricity conducting material with a high thermal and chemical resistance. The heating plate consists for example of a graphite body whose surface is completely coated, that is without spaces, with pure SiC or pure silicon. The heating plate 2 with the semiconductor wafers to be processed, is arranged in the interior of a quartz reaction tube. Each end of the tube is provided with a gas supply tube 4 or 5 respectively. At the location of the heater 2, the tube is enclosed concentrically by an induction coil. A forked tube 7 is provided for the supply of gas, whose forks lead via a gas valve, respectively $H_1$ $H_2$, to a gas inlet respectively, 4 or 5, entering the reaction tube. These gas inlets are so installed in the reaction tube that a current of gas flows therefrom, in opposite direction, approximately tangential across the semiconductor wafers 1, being processed. In the example, both inlets are arranged at the ends of the reaction tube 3.

Each of the two gas inlets 4 and 5 is not only connected with the common gas lead 7, but also with an outlet, via another tube respectively provided with a gas valve $H_3$ or $H_4$. It thus becomes clear that it is possible to transport the gas with this device, alternately in the direction from the inlet 4 toward the inlet 5 which then serves as an outlet, and vice versa. To this end, the gas valve pairs provided for each of the two inlets 4 or 5, are kept selectively one open and one closed in such a way that, e.g. in one valve pair ($H_1$, $H_3$, or $H_2$, $H_4$) the valve is open for the outlet, while in the other, the valve 7 is open for common gas supply.

We claim:

1. The method of precipitating layers of semiconducting or insulating material from a flowing reaction gas, upon heated semiconductor crystals, or for doping such crystals from a flowing dopant gas, wherein totally constant or only gradually changing operational conditions are maintained, which comprises carrying out the working phases under constant operational conditions, supplying approximately tangentially the reaction gas during one-half of the required time thereto, from one side, while during the other half of the required time period from the opposite side, over the semiconductor crystals to be processed.

2. The method as claimed in claim 1, wherein during the individual phases of the constant operational conditions, the process is being effected with repeatedly changing flow direction.

* * * * *